Oct. 8, 1935.   C. B. SHILLINGER   2,016,393
GLASSWARE FORMING MACHINE
Filed May 23, 1932   5 Sheets-Sheet 4
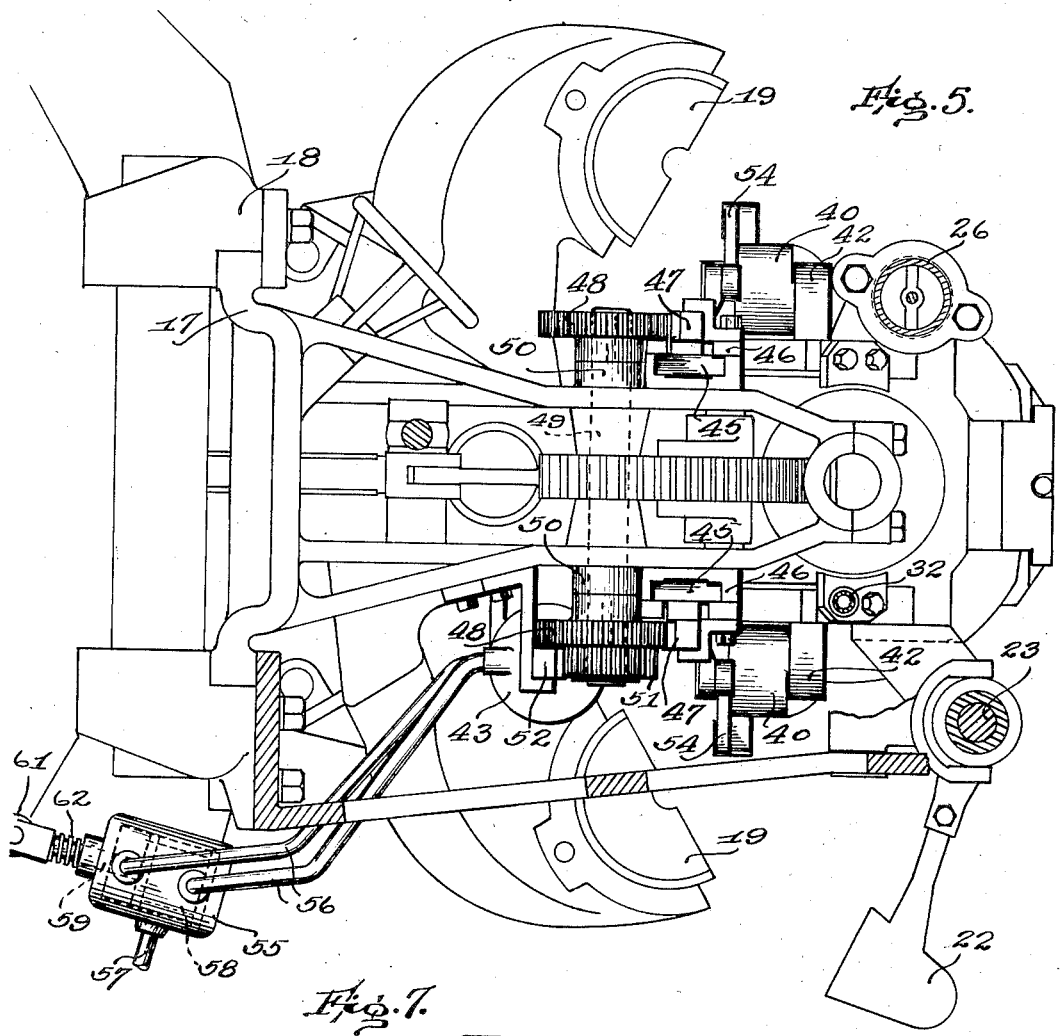
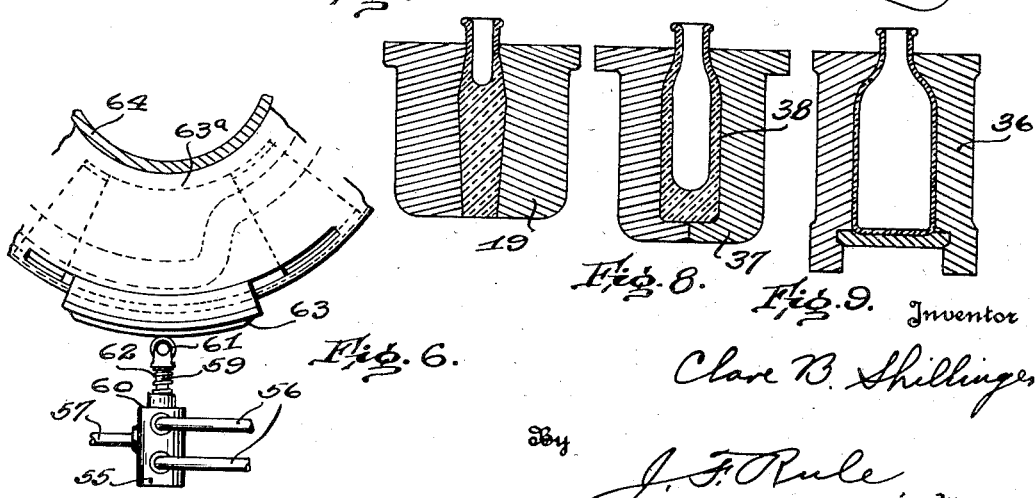

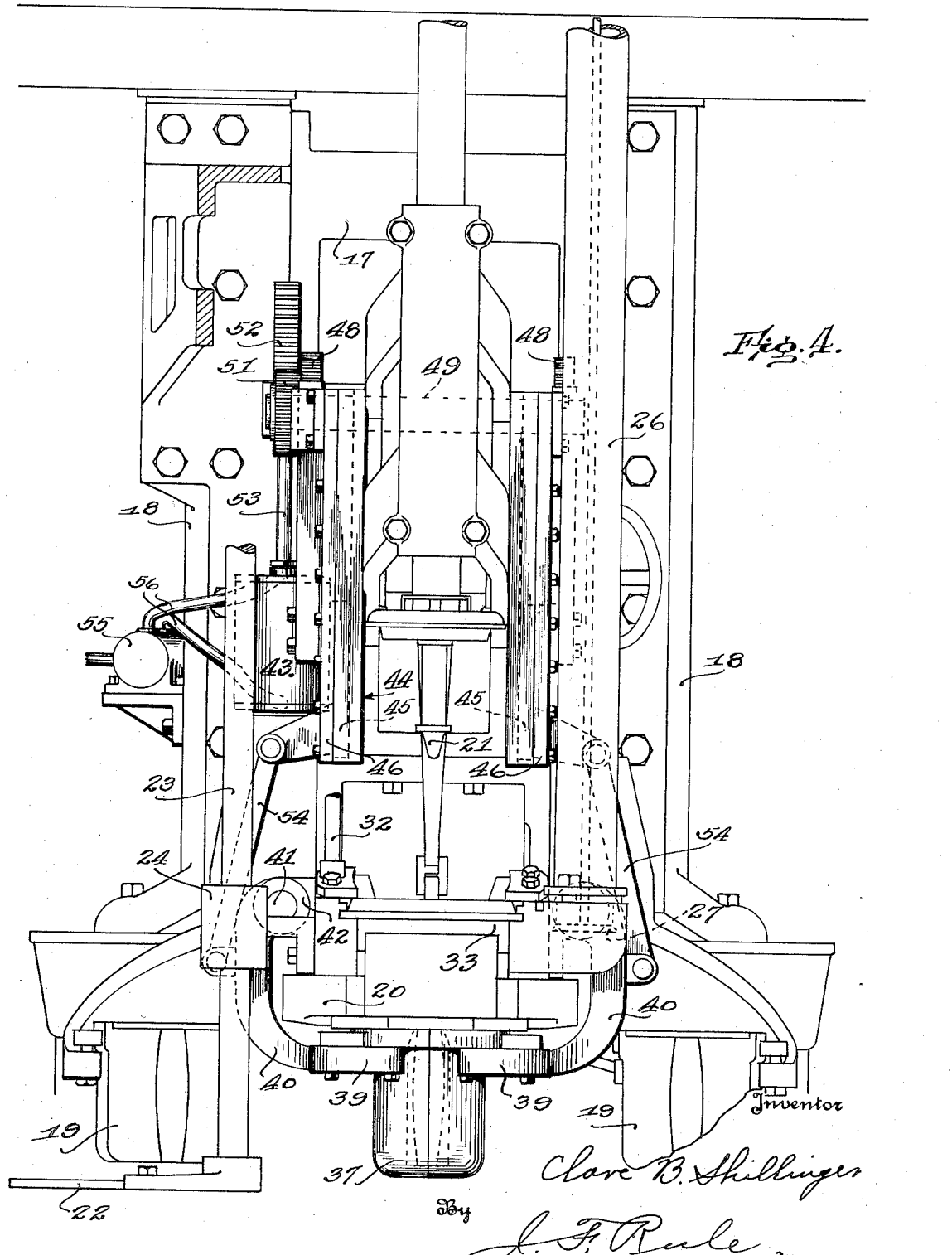

Oct. 8, 1935. C. B. SHILLINGER 2,016,393
GLASSWARE FORMING MACHINE
Filed May 23, 1932   5 Sheets-Sheet 5

Patented Oct. 8, 1935

2,016,393

UNITED STATES PATENT OFFICE 2,016,393

GLASSWARE FORMING MACHINE

Clare B. Shillinger, Toledo, Ohio, assignor to Owens-Illinois Glass Company, a corporation of Ohio Application May 23, 1932, Serial No. 612,996

13 Claims. (Cl. 49—5)

The present invention relates to improvements in glassware forming machines and more particularly to machines consisting of a series of article forming units or mold groups adapted for movement in a closed horizontal path. In machines of this type the mold groups which ordinarily are subjected to continuous movement about a common vertical axis, include a partible blank mold and a partible finishing mold. The blank molds are broken one at a time into contact with a supply body of molten glass and filled by means of vacuum or suction. In this mold the gathered charge of glass is transformed into a solid blank having an initial blow opening in its upper end. The blank or parison is then transferred to a finishing mold and air under pressure is introduced into said initial blow opening. This results in expansion of the blank into contact with the walls of the finishing molds and completion of the article shaping operation. The finishing mold is then opened and the finished article removed from the machine.

It has been found that an intermediate expansion of the blanks or parisons following the usual blank forming operation but prior to their being enclosed in the finishing mold results in a material improvement in the distribution of glass in the articles produced and because of the more uniform distribution of glass greatly improved annealing has also been effected.

An object of the present invention is the provision of novel means for modifying a standard suction type machine to include the feature of intermediate expansion of the blanks or parisons in advance of the usual final blowing operation.

Another object is the provision of a secondary blank mold individual to each mold group or unit of a single table suction type machine whereby the gathered mold charges may be individually shaped between the usual blank forming and final blowing operations. To this end there is provided a secondary blank mold having a cavity closely resembling in shape but of less diameter than the finishing mold cavity in which the blanks or parisons are placed for intermediate expansion prior to their being enclosed in the finishing mold.

Other objects will be in part apparent and in part pointed out hereinafter.

In the drawings:

Fig. 4 is an enlarged front elevational view showing the invention in detail.

Fig. 5 is a sectional plan view of one mold group taken along the line V—V of Fig. 1.

Fig. 6 is a fragmentary plan view showing the air control valve for the motor which opens and closes the secondary blank mold.

Figs. 7, 8, and 9, are sectional views showing the successive operations to which the glass is subjected in forming a bottle. Fig. 7 shows a blank or parison in the primary blank mold. Fig. 8 shows the form given the blank in the secondary blank mold or intermediate mold. Fig. 9 shows the blank expanded to its final shape in the finishing mold.

Figure 10:
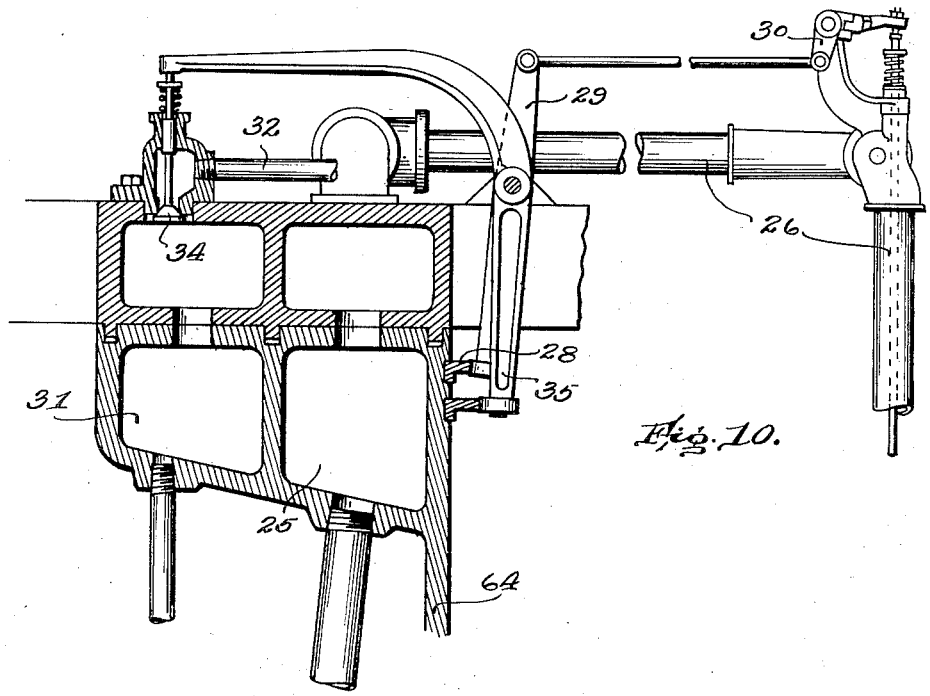

Fig. 10 is a detail sectional elevational view showing the air and vacuum control valves for the primary and secondary blank molds.

Figure 11:
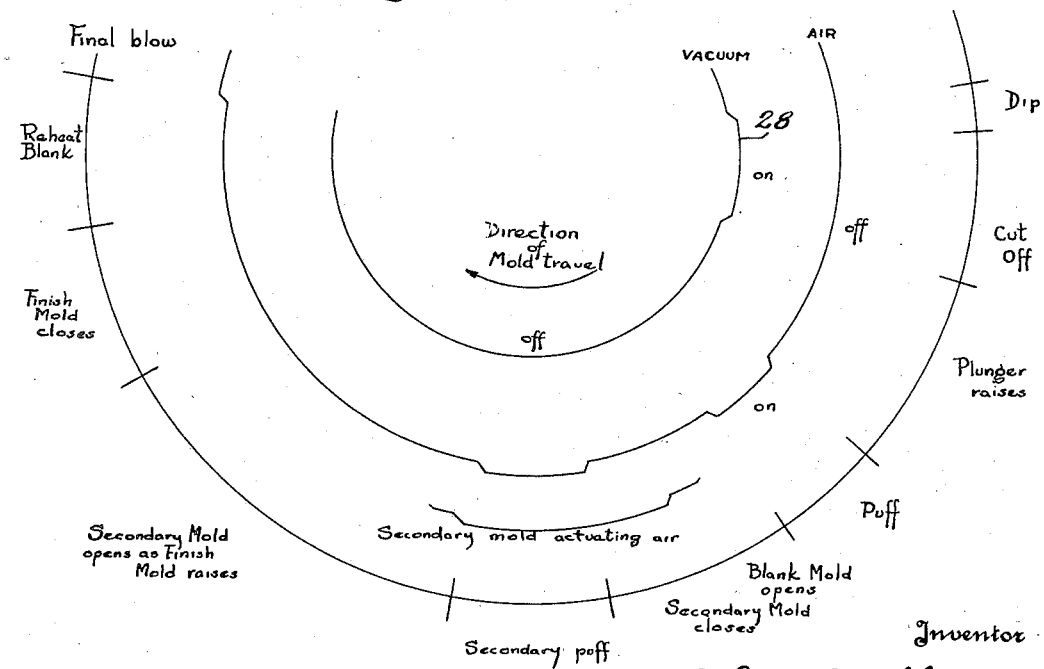

Fig. 11 is a cam chart and diagram setting out the relation between the various operations making up a single cycle in which an article of glassware is completely finished.

In more or less general terms the present invention consists of the embodiment in each mold group or unit of a standard Owens suction type machine such as shown in La France Patent 1,185,687, dated June 6, 1916, of a secondary blank mold or intermediate mold in which the blanks or parisons are partially expanded in advance of complete expansion thereof in the usual finishing mold. For this purpose each mold group or unit is equipped with a partible secondary blank mold, the cavity of which closely resembles the contour but is of less diameter and length than the finishing mold cavity. This secondary blank mold is closed about a blank or parison suspended from the neck mold after the usual primary blank mold has been opened. Air under pressure is introduced into the upper end of the blank causing expansion thereof into contact with the walls of the secondary blank mold cavity. The blank is then placed in the finishing mold and completely expanded.

Figure 1:
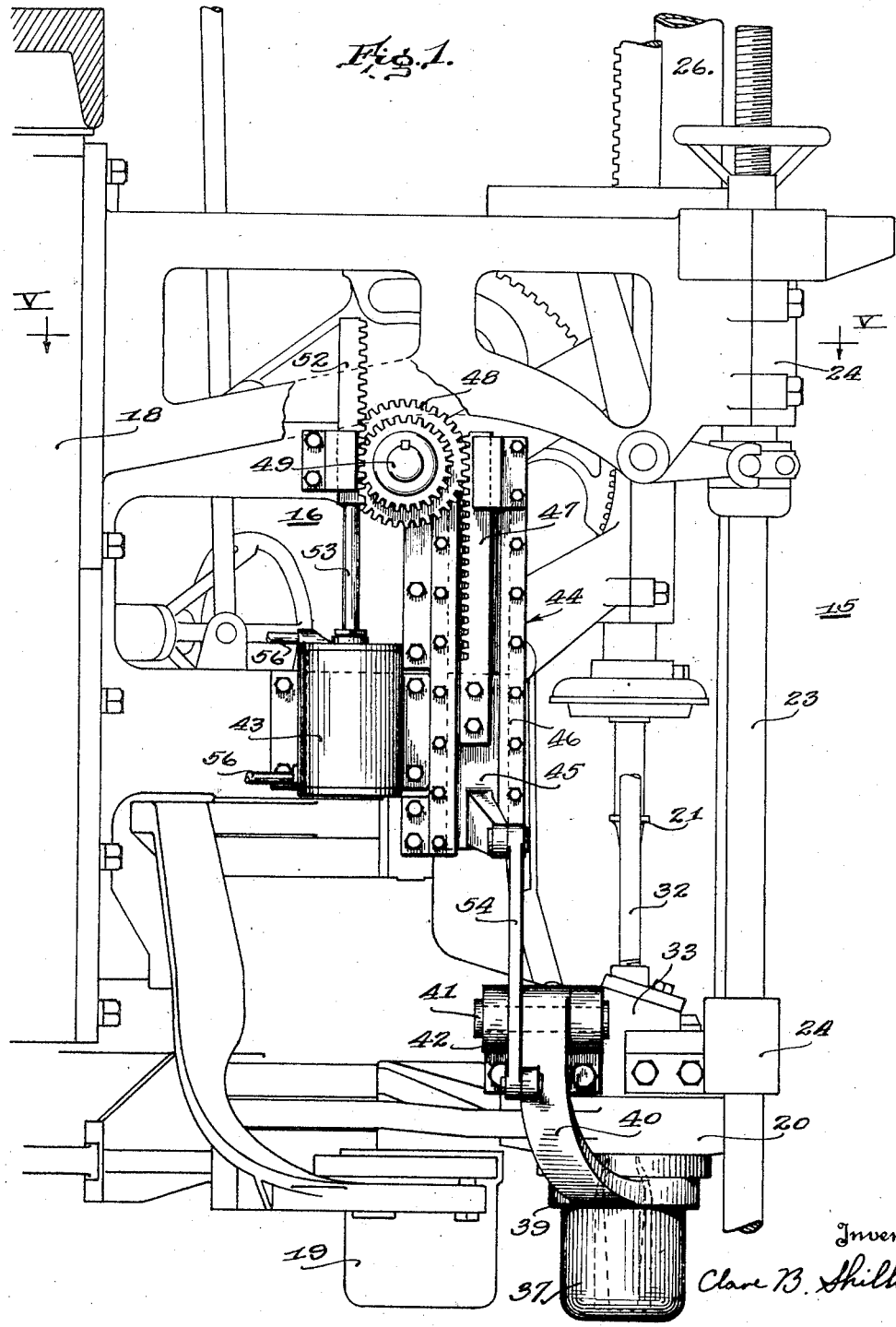
Fig. 1 is a side elevational view showing the present invention embodied in a standard blank mold unit of an Owens suction type machine.
Figure 2:
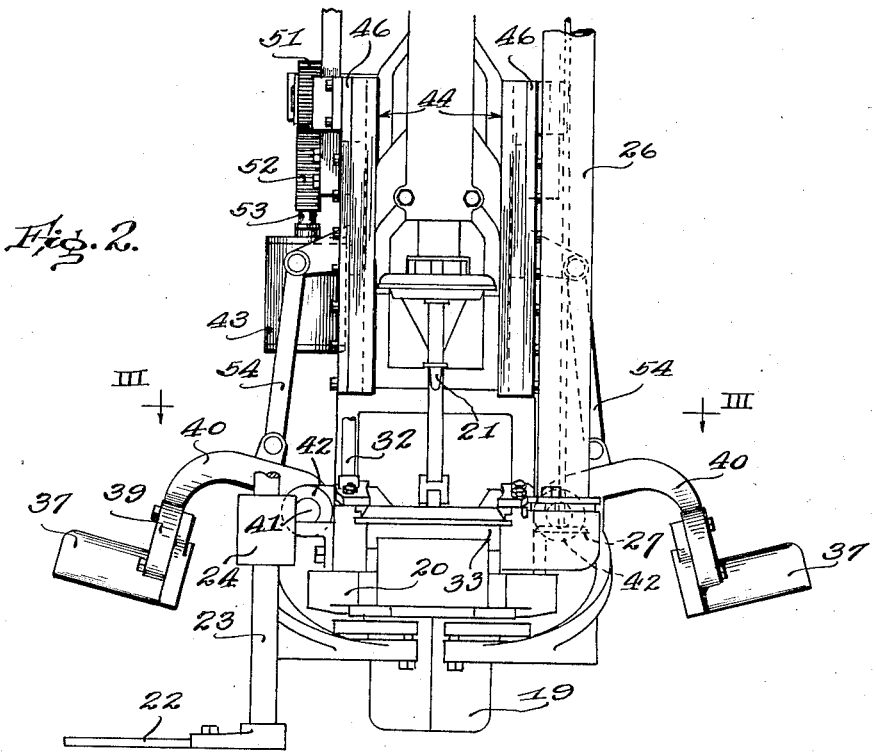
Fig. 2 is a front elevational view thereof.
Figure 3:
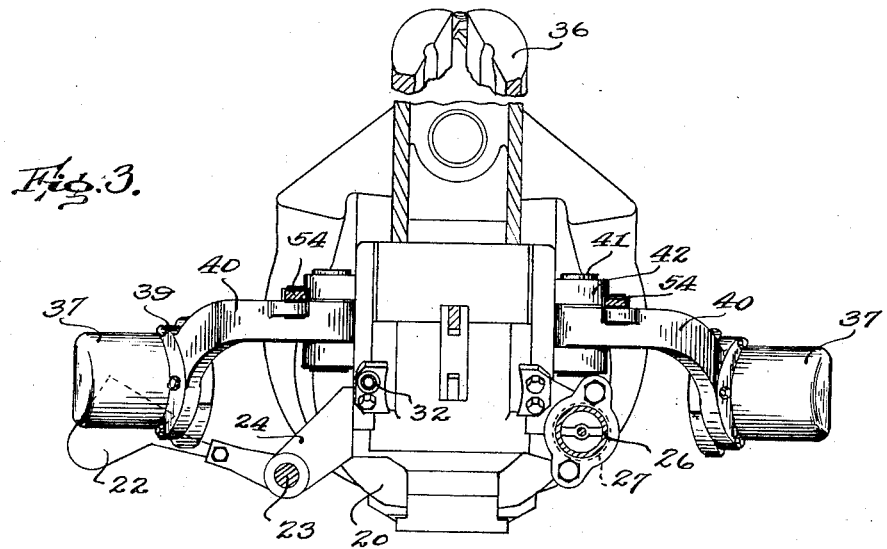
Fig. 3 is a sectional plan view taken along the line III—III of Fig. 2.

The secondary blank mold is shown in connection with a mold group 15 the general construction of which is in accordance with the disclosure in the above identified La France patent. This construction includes a dipping frame 16 carried by a slide 17 (Figs. 1 and 5) which is mounted in vertical slideways 18 forming part of a rotary mold carriage. A partible primary blank mold 19 is mounted at the lower end of the dipping frame 16 in the usual manner and cooperates with a partible neck mold 20 as is customary. A plunger 21 is mounted on the dipping frame 16 for vertical reciprocating movement into and out of position for cooperation with the neck mold. A cut-off knife 22 for separating gathered mold charges from the supply body of glass (not shown), is supported at the lower end of a vertical rock shaft 23 which is journaled in bearings 24 on the dipping frame 16. This knife and the operating mechanism therefor are of well known construction. Vacuum is applied to the neck and blank molds at regular time intervals for the purpose of gathering mold charges of molten glass from the supply body. For this purpose there is provided a vacuum chamber 25 (Fig. 10) connected through pipes 26 to the molds. A vacuum control valve 27 (Fig. 4) is arranged in the pipe line 26 and operated at regular time intervals by means of a cam 28 (Fig. 10) which rocks a lever 29, the latter suitably connected to a bell crank lever 30 acting directly upon the valve 27. Air under pressure is supplied to the neck mold 20 at regular time intervals for the purpose of forming an initial blow opening, expanding the blank or parison in the intermediate or secondary blank mold and completing the expanding operation in the finishing mold. In this connection there is provided an air chamber 31 (Fig. 10) communicating through a pipe 32 with the head casting 33 which normally engages the upper surface of and opens into the neck mold 20. A cam operated air pressure valve 34 is opened and closed at regular time intervals by means of a rock arm 35 to alternately make and break communication between said chamber and the neck mold 20.

Below the blank mold group there is arranged a partible finishing mold 36 in which the blanks or parisons are placed for expansion to the final shape of the articles of glassware being produced. This finishing mold forms part of a finishing mold group or unit such as that described in the La France patent above identified. The mold group as shown in said patent is raised at regular time intervals for cooperation with the neck mold 20 of the blank forming unit.

As brought out heretofore, it has been found desirable to give the blanks or parisons a form or shape closely resembling that of the finished article prior to placing it in the finishing mold. An outstanding advantage of such shaping is manifested in the exceptionally uniform distribution of glass in the finished article and a general improvement in quality of the article because of this uniform distribution of glass and the improved annealing resulting directly therefrom. Such intermediate shaping of the blank or parison is obtained by means of a secondary blank mold 37 or intermediate mold which is closed about the bare parison suspended from the neck mold after the primary blank mold has been opened. The secondary blank mold 37 comprises two partible sections, the cavity 38 of which is somewhat larger than the cavity in the primary blank mold and smaller as to diameter than the cavity of the finishing mold 36. As a result of so proportioning the cavity dimensions, a blank or parison will when expanded in the secondary blank mold assume substantially the shape shown in Fig. 8. The secondary blank mold sections are suitably mounted upon holders 39 provided at the lower ends of a pair of pivoted arms 40, the latter being pivoted to horizontal hinge pins 41 which in turn are supported in brackets 42 on the head casting 33. These hinge pins 41 are disposed at opposite sides of the head casting and have their axes extending substantially radially of the mold carriage.

Opening and closing of the secondary blank mold is obtained by means of an air motor 43 operating through suitable rack and pinion mechanism 44 which will now be described. The rack and pinion mechanism 44 includes a pair of opposed vertical slides 45 (Fig. 5) mounted in vertical slideways 46 on the dipping frame 16 and carrying rack bars 47 which constantly mesh with pinions 48. These pinions are mounted upon a horizontal shaft 49 which extends transversely of the dipping frame 16 and is journaled in bearings 50 thereon. A pinion 51 at one end of the shaft 49 runs in mesh with a vertical rack bar 52 which constitutes an upward extension of the piston rod 53 of said air motor 43. Operation of the air motor imparts a vertical reciprocating movement to the slides 45, the latter operating through links 54 connecting the slides and said arms 40, to alternately open and close the secondary blank mold as brought out heretofore.

Operation of the air motor 43 is controlled by a valve 55 which is connected to the opposite ends of the motor cylinder by means of pipes 56. The valve in turn is connected to any suitable source of supply of air under pressure (not shown) by a pipe 57. The valve includes a piston 58 connected to a stem 59 or rod which extends through one end of a cylinder 60 and carries a cam roll 61 at its outer end. A coil spring 62 encircling the stem 59 outwardly of the cylinder 60, normally holds the piston in position to shut off the supply of air under pressure to the lower end of the air motor 43. As a result, air under pressure is supplied to the upper end of the air motor and holds the secondary blank mold 37 open. A stationary cam 63 which is adjustably mounted upon a cam plate 63ª on the central column 64 engages the roller 61 at regular time intervals causing movement of the valve piston 58 to the outer end of the cylinder 60. As a result, air under pressure is applied to the lower end of the air motor 43 which through the rack and pinion mechanism causes the secondary blank mold 37 to close about a blank or parison suspended from the neck mold 20. By adjusting the position of the cam 63 the point at which the secondary blank mold closes may be varied.

In operation, the mold group is rotated continuously about the vertical axis of the central column 64. By reference to Fig. 11 the successive operations involved will be understood. The dipping frame is first lowered to bring the primary blank mold 19 into contact with the supply body of molten glass. At this time the cam 28 opens the vacuum valve 27 and the air is exhausted from the mold. In this manner a mold charge of molten glass is gathered into said mold. The mold is then lifted away from the glass and the cut-off knife 22 swung across the lower end of the mold to sever the gathered charge of glass from the supply body. Vacuum is then shut off and the plunger 21 lifted.

With the knife 22 closing the lower end of the mold, air under pressure is applied to the upper end of the blank in order to compact the glass in the primary blank mold. The air under pressure is then shut off, the knife 22 removed, and the primary blank mold 19 opened. The cam 63 (Fig. 6) then operates the valve 55 for the purpose of delivering the air to the lower end of the air motor 43. This closes the secondary blank mold 37 about the blank or parison. Air under pressure is again applied to the blank expanding it substantially as shown in Fig. 8. Following this operating and shutting off the air, the secondary blank mold is opened leaving the partially expanded bare blank suspended from the neck mold. The finishing mold 36 is then raised and closed about the blank after which the usual final blowing operation is effected and the finished article discharged from the machine.

Modifications may be resorted to within the spirit and scope of the appended claims.

What I claim is:

1. In a glassware forming machine, the combination of a mold group mounted for rotation about a vertical axis, said mold group including a dipping frame, partible neck and primary blank molds on said frame, a partible secondary blank mold having a cavity differing in shape from the primary blank mold cavity and mounted on said frame, means for alternately placing the primary and secondary blank molds in position for cooperation with the neck molds, a partible finishing mold arranged below the dipping frame, and means for closing the finishing mold about a parison suspended from the neck mold after the secondary blank mold has been opened.

2. In a glassware forming machine, the combination of a mold group mounted for rotation about a vertical axis, said mold group including a dipping frame, partible neck and primary blank molds on said frame, a partible secondary blank mold having a cavity differing in shape from the primary blank mold cavity and mounted on said frame, means for alternately placing the primary and secondary blank molds in position for cooperation with the neck molds, a partible finishing mold arranged below the dipping frame, means for closing the finishing mold about a parison suspended from the neck mold after the secondary blank mold has been opened, and means for expanding the parison to varying degrees in the secondary blank mold and finishing mold.

3. In a glassware forming machine, the combination of a mold group mounted for rotation about a vertical axis, said mold group including a dipping frame mounted for up and down movement, cooperating partible neck and primary blank molds on said dipping frame, means for opening and closing said molds about a common vertical axis, suction means for delivering a charge of glass to said molds, said mold group including a partible secondary blank mold adapted to close about a blank suspended from the neck mold at the closed position of the primary blank mold, said secondary blank mold having a cavity larger than the primary blank mold and smaller than the finishing mold cavities, means for applying air under pressure to said blank while enclosed in the primary and secondary blank molds, and a finishing mold adapted to close about the parison after the secondary blank mold has opened.

4. In a glassware forming machine, the combination of a mold group mounted for rotation about a vertical axis, said mold group including a dipping frame mounted for up and down movement, cooperating partible neck and primary blank molds on said dipping frame, means for opening and closing said molds about a common vertical axis, suction means for delivering a charge of glass to said molds and transferring it into a blank, a partible secondary blank mold mounted on said dipping frame and adapted to close about the blank suspended from the neck mold at the closed position of the primary blank mold, means for applying air under pressure to said blank while enclosed in the primary and secondary blank molds, means for opening and closing the secondary blank mold including an air operated piston motor, rack and pinion mechanism actuated by said motor, and links providing connection between said rack and pinion mechanism and the secondary blank mold sections.

5. In a glassware forming machine, the combination of a mold group mounted for rotation about a vertical axis, said mold group including a dipping frame mounted for up and down movement, cooperating partible neck and primary blank molds on said dipping frame, means for opening and closing said molds about a common vertical axis, suction means for delivering a charge of glass to said molds, said mold group including a partible secondary blank mold mounted on said dipping frame and adapted to close about a blank suspended from the neck mold at the closed position of the primary blank mold, means for applying air under pressure to said blank while enclosed in the primary and secondary blank molds, means for alternately opening and closing the secondary blank mold including a pair of arms carrying the mold sections and pivoted for swinging movement in a vertical plane, rack and pinion mechanism connected to each arm, an air operated piston motor for actuating said rack and pinion mechanisms at regular time intervals, and a finishing mold in which parisons partially formed in the secondary blank mold are finally shaped.

6. In a glassware forming machine, the combination of a suction primary blank mold in which a mold charge of glass is transformed into a blank, a neck mold, a partible secondary blank mold in which the parison is partially expanded while supported in the neck mold, a finishing mold, means for closing the finishing mold about the parison while the latter is supported in the neck mold, means for blowing the parison to its final shape in the finishing mold, means for opening and closing the secondary blank mold including pivoted supporting arms mounted for swinging movement in a vertical plane, rack and pinion mechanism for swinging said arms, and automatic means for actuating said rack and pinion mechanism.

7. In a glassware forming machine, the combination of a suction primary blank mold in which a mold charge of glass is transformed into a blank, a neck mold, a partible secondary blank mold in which the parison is partially expanded while supported in the neck mold, a finishing mold, means for closing the finishing mold about the parison while the latter is supported in the neck mold, means for blowing the parison to its final shape in the finishing mold, means for alternately opening and closing the secondary blank mold comprising a pair of arms supporting the mold section and pivoted for swinging movement in a vertical plane about separate axes, rack and pinion mechanism for swinging said arms, and an air operated piston motor for actuating said rack and pinion mechanism.

8. In a glassware forming machine, the combination of a suction primary blank mold in which a mold charge of glass is transformed into a blank, a neck mold, a partible secondary blank mold in which the parison is partially expanded while supported in the neck mold, a finishing mold, means for closing the finishing mold about the parison while the latter is supported in the neck mold, means for blowing the parison to its final shape in the finishing mold, means for alternately opening and closing the secondary blank mold comprising a pair of arms supporting the mold section and pivoted for swinging movement in a vertical plane about separate axes, rack and pinion mechanism individual to said arms, means providing connection between said mechanism and arms, and automatic means for actuating said mechanism.

9. In a glassware forming machine, the combination of a suction primary blank mold in which a mold charge of glass is transformed into a blank, a neck mold, a partible secondary blank mold in which the parison is partially expanded while supported in the neck mold, a finishing mold, means for closing the finishing mold about the parison while the latter is supported in the neck mold, means for blowing the parison to its final shape in the finishing mold, means for alternately opening and closing the secondary blank mold comprising a pair of arms supporting the mold section and pivoted for swinging movement in a vertical plane about separate axes, rack and pinion mechanism individual to said arms, means providing connection between said mechanism and arms, an air operated piston motor for actuating said rack and pinion mechanism, an air pressure control valve for the piston motor, and an adjustable cam for operating said valve and thereby regulably controlling the point of operation of said motor and opening and closing of the secondary blank mold.

10. In a machine for forming hollow glass articles, the combination of a mold carriage rotatable about a vertical axis, an annular series of mold groups rotating with the mold carriage, each mold group comprising a neck mold, a primary blank mold and a secondary blank mold, means for closing the primary blank mold in register with the neck mold, means for introducing a charge of glass by suction into the combined neck mold and primary blank mold to form a blank, means for closing the secondary blank mold about the blank while supported in the neck mold, means for blowing the blank to form a hollow parison in said secondary mold, finishing molds individual to the mold groups, and means for blowing the parisons in the finishing molds to their final form.

11. In a machine for forming hollow glass articles, the combination of a mold carriage rotatable about a vertical axis, an annular series of mold groups rotating with the mold carriage, each mold group comprising a neck mold, a primary blank mold and a secondary blank mold, means for closing the primary blank mold in register with the neck mold, means for introducing a charge of glass by suction into the combined neck mold and primary blank mold to form a blank, means for closing the secondary blank mold about the blank while supported in the neck mold, means for blowing the blank to form a hollow parison in said secondary mold, finishing molds individual to the mold groups, means for closing the finishing molds about the parisons while the latter are supported in the neck mold and after they have been blown in the secondary blank mold, and means for blowing the parisons in the finishing molds to their final form.

12. In a machine for forming hollow glass articles, the combination of a mold carriage rotatable about a vertical axis, a dip frame thereon, a neck mold on said frame, a primary blank mold comprising separable sections having meeting faces in a vertical plane radial to the mold carriage, arms carrying said sections mounted on said frame to swing about vertical axes for separating said sections, a secondary blank mold comprising separable sections having their meeting faces in a vertical plane, arms carrying said sections of the secondary mold and mounted on said frame to swing about horizontal axes for opening and closing the secondary mold, said primary and secondary molds arranged to alternatively register with the neck mold, means for introducing a charge of glass by suction into the combined primary blank mold and neck mold, means for blowing the blank in the combined neck mold and secondary blank mold, a finishing mold, and means for blowing the blank in the combined neck mold and finishing mold.

13. In a machine for forming hollow glass articles, the combination of a mold carriage rotatable about a vertical axis, a dip frame thereon, a neck mold on said frame, a primary blank mold comprising separable sections having meeting faces in a vertical plane radial to the mold carriage, arms carrying said sections mounted on said frame to swing about vertical axes for separating said sections, a secondary blank mold comprising separable sections having their meeting faces in a vertical plane, arms carrying said sections of the secondary mold and mounted on said frame to swing about horizontal axes for opening and closing the secondary mold, the pivots for said last mentioned arms being positioned above the secondary blank mold sections and extending transversely of their direction of movement with the mold carriage, said primary and secondary molds arranged to alternatively register with the neck mold, means for introducing a charge of glass by suction into the combined primary blank mold and neck mold, means for blowing the blank in the combined neck mold and secondary blank mold, a finishing mold, and means for blowing the blank in the combined neck mold and finishing mold.

CLARE B. SHILLINGER.